J. E. COMPTON.
BIRD CAGE.
APPLICATION FILED JUNE 23, 1909.
963,995.
Patented July 12, 1910.
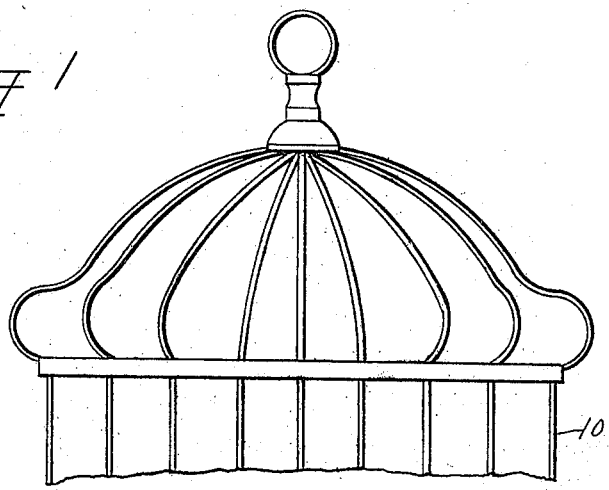
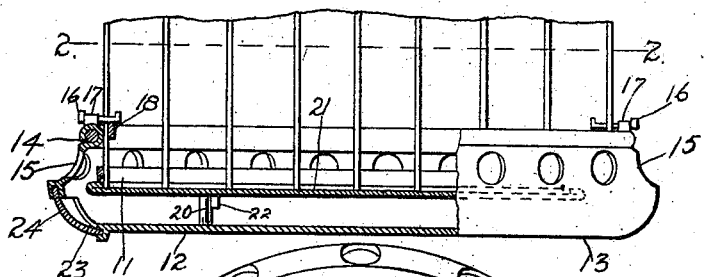
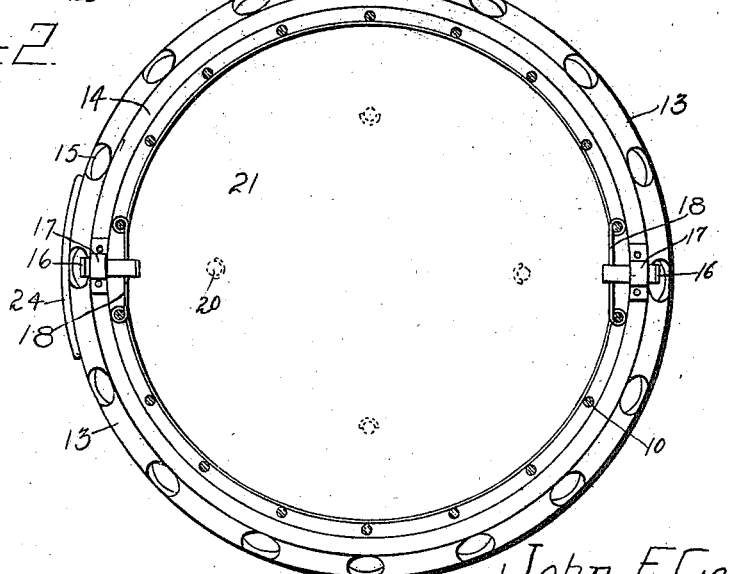
Witnesses
J. E. Strobel.
C. N. Woodward.
Inventor
John E. Compton
By Chandler & Chandler
Attorneys

UNITED STATES PATENT OFFICE.

JOHN E. COMPTON, OF RED LODGE, MONTANA.

BIRD-CAGE.

963,995.   Specification of Letters Patent.   Patented July 12, 1910.

Application filed June 23, 1909. Serial No. 503,853.

*To all whom it may concern:*

Be it known that I, JOHN E. COMPTON, a citizen of the United States, residing at Red Lodge, in the county of Carbon, State of Montana, have invented certain new and useful Improvements in Bird-Cages; and I do hereby declare the following to be a full, clear, and exact description of the invention, such as will enable others skilled in the art to which it appertains to make and use the same.

This invention relates to bird cages, and has for one of its objects to improve the construction and increase the efficiency and utility of devices of this character.

Another object of the invention is to provide a simply constructed device wherein feathers, droppings and other matter, disengaged from the birds will be prevented from flying outward into the room, but will be retained within the cage.

With these and other objects in view, the invention consists in certain novel features of construction as hereafter shown and described and then specifically pointed out in the claim, and in the drawings illustrative of the preferred embodiment of the invention, Figure 1 is a side elevation, partly in section, of the improved cage. Fig. 2 is a plan view in section on the line 2—2 of Fig. 1.

The superstructure of the improved cage may be of any of the usual forms, but for the purpose of illustration is shown of the usual circular form and consisting of the vertical spaced bars or wires 10 having the usual encircling band 11 at their lower ends. The bottom closure of the cage structure comprises a flat bottom 12 having an upturned and inwardly directed edge 13, the upper edge of the bottom being preferably rolled at 14 around an encircling binding wire, to increase the stiffness and strength of the bottom. The binding wire is secured in place by folding the material forming the bottom 12—13 around the wire as shown at the left of Fig. 1. The wires 10 which constitute the body of the cage bear against the inner face of the upper portion 13, and upon the plate 21 but are not attached thereto. The upwardly and inwardly directed portion 13 is provided with a plurality of relatively large apertures 15 to decrease the weight and to increase the circulation of air, as hereafter explained.

The cage 10—11 is secured to the bottom members 12—13 in any suitable manner, but preferably by sliding catches 16 operating through the keepers 17 upon the rim 14 and bearing over stop plates 18 secured across two of the wires 10 at opposite sides, as shown. By this means the cage portion will be readily but firmly coupled to the bottom portion, and their separation prevented while in use.

Formed in one side of the base portion is an opening 23 provided with a sliding closure 24, to permit the ready removal of matter which accumulates beneath the plate 21.

Rising from the bottom 12 at suitable intervals are a plurality of posts or standards 20 upon which a plate 21 is supported, the plate having stop members 22, to limit the lateral movement of the plate. The plate is thus spaced away from the bottom 12 a distance equal to the lengths of the posts 20, and the plate extends at its margin beneath the sides of the cage, and is spaced from the upturned margin 13 of the bottom.

With a device thus constructed the air circulates freely beneath the plate 21 and thus materially improves the circulation and prevents the accumulation of dead or foul air.

The bottom member 12—13 will preferably be spun up from sheet metal, and may be of brass or other suitable metal and plated or otherwise ornamented. The bottom member is detachable from the superstructure 10 while the plate 21 is detachable from the bottom member, so that the parts may be readily separated for cleansing when required.

What is claimed is:—

In a bird cage, a bottom portion having an upwardly directed margin having a perforated upper portion, a plate within said cage and of less area than the same, and means for supporting said plate spaced above said bottom portion and below the perforation of the margin.

In testimony whereof, I affix my signature, in presence of two witnesses.

JOHN E. COMPTON.

Witnesses:
L. O. CASWELL,
J. E. DEEGAN.